United States Patent [19]

Davies

[11] 4,440,794

[45] Apr. 3, 1984

[54] INSTANT RICE PUDDING MIX

[75] Inventor: David L. Davies, Banbury, England

[73] Assignee: General Foods Corporation, White Plains, N.Y.

[21] Appl. No.: 468,443

[22] Filed: Feb. 22, 1983

[51] Int. Cl.³ .................. A23L 1/187; A23L 1/168; A23L 1/195

[52] U.S. Cl. .................. 426/578; 426/579; 426/618; 426/639; 426/661

[58] Field of Search ............... 426/579, 578, 618, 639, 426/449, 450, 549, 801, 661

[56] References Cited

U.S. PATENT DOCUMENTS

| | | | |
|---|---|---|---|
| 3,467,528 | 9/1969 | D'Ercole | 426/618 |
| 4,342,787 | 8/1982 | Rebaudieres et al. | 426/579 |
| 4,407,837 | 10/1983 | Holley | 426/579 |

FOREIGN PATENT DOCUMENTS 16649  10/1980  United Kingdom ............... 426/618

*Primary Examiner*—Jeanette M. Hunter

*Attorney, Agent, or Firm*—Walter Scott; Joyce P. Hill; Thomas R. Savoie

[57] ABSTRACT

An instant rice pudding mix which comprises a mixture of a powder comprising 15 to 35% by weight of a finely divided sugar, 25 to 40% by weight of a starch, 5 to 20% by weight of a finely divided fat; 5 to 25% by weight of a dried skim-milk powder; up to 3% by weight of an emulsifier and 0 to 4% by weight of an edible gum; and granules formed by the extrusion of a dough formed from 87 to 100% by weight of rice flour, up to 4.0% by weight of a starch-complexing agent, up to 5% by weight of an aerating agent and up to 4.0% of dried skim milk powder and/or dried whey powder mixed with a proportion of water sufficient to produce an extrudable dough. The pudding mix of the invention may conveniently be made up by the addition of hot or boiling water to produce a product having the texture of a traditional rice pudding. The pudding mix of the invention may be packed in pouches, envelopes or other protective cartons which afford moisture-barrier features.

7 Claims, No Drawings

INSTANT RICE PUDDING MIX

TECHNICAL FIELD

The present invention relates to an instant rice pudding mix and, in particular, to a rice pudding mix which, when mixed with hot or boiling water rehydrates rapidly to provide a dessert product with the texture and appearance of a traditional rice pudding.

BACKGROUND ART

European Patent Specification No. 0016649 (Application No. 80300890.3 describes a process for producing a reformed rice product by the cold extrusion of a dough formed from a composition comprising a mixture of pregelatinized and ungelatinized flour, sodium chloride and fat in powder form, to obtain simulated rice grains and then drying the simulated rice grains at an elevated temperature. The reformed rice product produced in this manner rehydrates in water in about three minutes and the time required for the preparation of a simulated rice from such a product is thus significantly reduced.

We have not developed an instant rice pudding mix which is a mixture of granules preformed from rice flour by extrusion and a powder containing a starch which provides the overall body of the pudding on rehydration of the pudding mix with hot or boiling water. An instant rice pudding mix of this type would not, however, be formed from the reformed rice product disclosed in European Patent Specification No. 0016649.

DISCLOSURE OF THE INVENTION

Accordingly, the present invention provides an instant rice pudding mix which comprises a mixture of a powder comprising 15 to 35% by weight of a finely divided sugar, 25 to 40% by weight of a starch, 5 to 20% by weight of a finely divided fat; 5 to 25% by weight of a dried skim-milk powder; up to 3% by weight of an emulsifier and 0 to 4% by weight of an edible gum and granules formed by the extrusion of a dough formed from 87 to 100% by weight or rice flour, up to 4.0% by weight of a starch-complexing agent, up to 5% by weight of an aerating agent and up to 4.0% of dried skim milk powder and/or dried whey powder mixed with a proportion of water sufficient to produce an extrudable dough.

The rice pudding mix of the present invention preferably comprises from 55 to 80% by weight of the powder and from 20 to 45% by weight of the granules.

The finely divided sugar which is used in the pudding mix of the invention may be glucose, corn syrup solids, fructose or most preferably, sucrose. Artifical sweetening aids may also be included in the composition, if desired.

The starch which is used in the pudding mix of the invention is preferably waxy rice starch. The starch is a powder, 99% by weight of which passes through a 105 micron sieve.

The finely divided fat used in the pudding mix of the invention can preferably by provided by the use of a spray-dried fat emulsion which includes the emulsifier component therein.

The edible gum used in the pudding mix of the invention is preferably guar gum or xantham gum.

The granules may be formed by the extrusion of the dough at an elevated temperature preferably in the range of from 70° to 140° C. The granules are dried in a manner known per se, for example by air drying or microwave heating at an elevated temperature. Alternatively and preferably, a thick rope may be extruded which is then dried as described above and subsequently reduced in size to granules. The granules preferably have the size and appearance of rice grains (i.e., about 2 mm×4 mm).

The rice flour used in the formation of the granules is preferably formed by the grinding of long grain rice, although rices with other grain lengths may be used.

The dough may contain up to 5% by weight of an aerating agent which will release a gas during extrusion to develop an aerated structure. Suitable gas forming agents include sodium bicarbonate, ammonium carbonate, solid carbon dioxide and baking powder, which is the preferred aerating agent. In an alternative embodiment of the invention the aerating agent may be omitted from the composition or the amount thereof significantly reduced if a gas such as carbon dioxide or nitrogen is injected into the dough during the extrusion process to provide the dough with an aerated structure.

Flavoring and coloring materials may be included in the rice pudding mix, as desired, as an ingredient of either or both components.

The present invention is further illustrated by the following example.

EXAMPLE

A dough was formed by the addition of 28% by weight of water to the following dry mixture of ingredients.

| Medium grain rice flour | 97.15% |
| Baking Powder | 2.00% |
| Glyceryl monostearate | 0.75% |
| Xanthan gum | 0.10% |

This dough was extruded at a temperature of 66° C. through a single screw extruder to form a rope which was dried at 121° C. in an air-flow oven for 20 minutes. The dried extrudate was then comminuted to form granules of the size and appearance of rice grains.

A powder was formed by blending the following dry ingredients.

| Pulverized sucrose | 25.00% |
| Waxy rice starch | 33.00% |
| Dried fat emulsion | 32.00% |
| Dried skim-milk powder | 8.50% |
| Color and flavoring | 1.50% |

A pudding mix was prepared by compounding 20% by weight of the granules with 80% by weight of the powder.

The rice pudding mix of the invention is typically made up by the addition of 430 ml of hot (minimum temperature 80° C.) or boiling water to 100 grams of the mix. The texture of the product is typical of that of a traditional rice pudding. This would not be achieved by the separate addition of hot or boiling water to each of the granules and powder components and subsequently combining them, since the grains would then lose their discrete nature.

The rice pudding mix of the present invention may be packed in pouches, envelopes and other protective cartons which afford moisture-barrier features.

I claim:

1. An instant rice pudding mix which comprises a mixture of a powder comprising 15 to 35% by weight of a finely divided sugar, 25 to 40% by weight of a starch, 5 to 20% by weight of a finely divided fat; 5 to 25% by weight of a dried skim-milk powder; up to 3% by weight of an emulsifier and 0 to 4% by weight of an edible gum; and granules formed by the extrusion of a dough formed from 87 to 100% by weight of rice flour, up to 4.0% by weight of a starch-complexing agent, up to 5% by weight of an aerating agent and up to 4.0% of dried skim milk powder and/or dried whey powder mixed with a proportion of water sufficient to produce an extrudable dough.

2. An instant rice pudding mix as claimed in claim 1 which comprises from 55 to 80% by weight of the powder mixture and from 20 to 45% by weight of the granules.

3. An instant rice pudding mix as claimed in claim 1 wherein the finely divided sugar is glucose, corn syrup solids, fructose or sucrose, the starch is a waxy rice starch, the finely divided fat is a spray-dried fat emulsion which includes the emulsifier therein and the edible gum is guar gum or xantham gum.

4. An instant rice pudding mix as claimed in claims 1, 2 or 3 wherein the rice flour used in the formation of the granules is formed by the grinding of the long grain rice.

5. An instant rice pudding mix as claimed in claims 1, 2 or 3 wherein the starch-complexing agent is glyceryl monostearate.

6. An instant rice pudding mix as claimed in claims 1, 2 or 3 wherein the aerating agent used in the extrudable dough is sodium bicarbonate, ammonium carbonate, solid carbon dioxide or baking powder.

7. An instant rice pudding mix as claimed in claims 1, 2 or 3 which is packed in a pouch or an envelope or another protective carton which affords moisture-barrier features.

* * * * *